US007605509B2

(12) United States Patent
Bühren

(10) Patent No.: US 7,605,509 B2
(45) Date of Patent: Oct. 20, 2009

(54) ROTOR SHAFT OF A SPINNING ROTOR

(75) Inventor: Stephan Bühren, Schwalmtal (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 535 days.

(21) Appl. No.: 10/587,558

(22) PCT Filed: Dec. 29, 2004

(86) PCT No.: PCT/EP2004/014787

§ 371 (c)(1), (2), (4) Date: Jul. 31, 2006

(87) PCT Pub. No.: WO2005/075719

PCT Pub. Date: Aug. 18, 2005

(65) Prior Publication Data

US 2007/0132329 A1 Jun. 14, 2007

(30) Foreign Application Priority Data

Feb. 6, 2004 (DE) ....................... 10 2004 005 846

(51) Int. Cl.
*H02K 1/27* (2006.01)
*H02K 1/28* (2006.01)
*H02K 15/03* (2006.01)
*H02K 7/09* (2006.01)

(52) U.S. Cl. ............. 310/90.5; 310/156.08; 310/156.38

(58) Field of Classification Search ................ 310/90.5, 310/156.08, 156.26, 156.32, 156.38; 29/598
See application file for complete search history.

(56) References Cited

U.S. PATENT DOCUMENTS

| | | | | |
|---|---|---|---|---|
| 5,126,610 | A | 6/1992 | Fremerey | 310/90.5 |
| 6,124,658 | A | 9/2000 | Coenen | 310/90.5 |
| 6,516,601 | B2 | 2/2003 | Coenen | 57/406 |
| 2002/0047404 | A1 | 4/2002 | Coenen | 310/90.5 |

FOREIGN PATENT DOCUMENTS

| | | | | |
|---|---|---|---|---|
| DE | 26 40 111 | | | 3/1978 |
| DE | 198 27 606 | A1 | | 12/1999 |
| DE | 100 22 736 | A1 | | 11/2001 |
| DE | 100 32 440 | A1 | | 1/2002 |
| EP | 0 332 979 | A2 | | 9/1989 |
| JP | 09096313 | A | * | 4/1997 |
| JP | 11146609 | A | * | 5/1999 |

* cited by examiner

*Primary Examiner*—Quyen Leung
*Assistant Examiner*—David W. Scheuermann
(74) *Attorney, Agent, or Firm*—K&L Gates LLP

(57) ABSTRACT

A rotor shaft of a spinning rotor has an annular magnet bearing component which is secured from the centrifugal force effective during the spinning process by means of a ring liner, for radially and axially supporting the rotor shaft, whereby the rotatable magnetic bearing component interacts with a stationary magnetic bearing component. The magnetic bearing component linked with the rotor shaft (4) of the spinning rotor (3) is configured as a slotted permanent magnet ring (32,42), thereby ensuring the deformability required for fitting a ring liner (6,7).

5 Claims, 2 Drawing Sheets

VI
27
7
9
42
47
36
VI 4
7
27
47
9
42

ROTOR SHAFT OF A SPINNING ROTOR

CROSS-REFERENCES TO RELATED APPLICATIONS

This application claims the benefit of German patent application 102004005846.6, filed Feb. 6, 2004, herein incorporated by reference.

BACKGROUND OF THE INVENTION

The invention relates to a rotor shaft of a spinning rotor and, more particularly, to a spinning rotor shaft with an annular magnetic bearing component, secured with respect to the centrifugal force effective during the spinning process by a ring liner, for radially and axially supporting the rotor shaft, and wherein the rotatable magnetic bearing component interacts with a stationarily arranged magnetic bearing component.

In conjunction with open end rotor spinning machines, spinning rotors and their bearing are known in various embodiments and described in detail in the patent literature. Spinning rotors of this type, as is known, run at a high speed during the spinning process in a rotor housing which is acted upon by reduced pressure. The majority of open end spinning machines in the market have spinning rotors, which are mounted by their rotor shaft in the bearing interspaced of a so-called support disc bearing arrangement. In the case of support disc bearing arrangements of this type, which allow rotor speeds>100,000 rpm, it is conventional to provide an additional axial bearing, which can be configured either as a mechanical bearing or as a magnetic bearing, for axial fixing of the spinning rotor.

Even if these support disc bearing arrangements have been successful in practice, they have the disadvantage that the support discs are mechanically substantially stressed, in particular in the region of their contact surfaces. The milling work occurring in these regions leads not only to not insubstantial wear of the contact coverings of the support discs, but also to power losses.

In the past, various attempts have been made to mount spinning rotors circulating at a high speed without wear.

German Patent Publication DE 198 27 606 A1 describes, for example, single motor driven spinning rotors, which are contactlessly supported in corresponding magnetic bearing arrangements. These magnetic bearing arrangements, in each case have an annular permanent magnet both on the stator side and on the rotor side. The permanent magnets are arranged in this case such that repelling magnetic bearing forces are effective between the rotor magnets and the stator magnets.

Provided in the region of the permanent magnets of the stator are also electrical windings, by which, as a function of the electrical current flow direction, the magnetic force of the stator magnets can be reinforced or lowered. The electrical windings are activated in this case via a corresponding control device as a function of signals of a sensor, which detects the axial deviation of the rotor shaft of the spinning rotor from its desired position, for example.

In the magnetic bearing arrangement according to German Patent Publication DE 198 27 606 A1, as already indicated above, the permanent magnets circulating with the spinning rotor are annular and let into cover elements, which are in turn connected in a rotationally engaged manner to the rotor shaft of the spinning rotor. This type of fixing of the permanent magnets rotating at a high speed was not satisfactory; there has now been a change to drawing the annular permanent magnets of the rotor onto bearing lugs of special receivers and securing the drawn-on permanent magnets with an external ring liner against the centrifugal forces occurring during the spinning operation. The special receivers for the permanent magnets are fixed here so as to be rotationally engaged on the rotor shaft.

With regard to drawing the annular permanents magnets onto the bearing lug of a receiver of this type and their securing by ring liners, until now two different methods were conventional. In other words, the ring magnets were either slipped with play onto the bearing lug of the receiver and then locked by a ring liner, the internal diameter of which was below the external diameter of the ring magnet, or the ring liners were initially fixed onto the ring magnets by means of a press fit and the surrounded ring magnets were then pressed, also by means of a press fit, onto the bearing lug of the associated receiver.

In the two methods, the diameter of the connection faces had to have very exacting tolerances, as there was otherwise the risk of damage to the relatively sensitive ring magnets during the pressing-on processes. The described methods proved to be not very effective overall, as despite exacting tolerances, damage to ring magnets during pressing on could not always be avoided. In other words, in the known manufacturing methods, the waste quota was relatively high.

SUMMARY OF THE INVENTION

Proceeding from the aforementioned prior art, the invention is based on the object of providing a rotor shaft of a spinning rotor with annular magnetic bearing components arranged so as to be rotationally engaged, which are configured such that these magnetic bearing components can be produced economically and reliably with respect to function.

This object is achieved according to the invention by a rotor shaft of a spinning rotor with an annular magnetic bearing component, which is secured with respect to the centrifugal force effective during the spinning process by a ring liner, for radially and axially supporting the rotor shaft, and wherein the rotatable magnetic bearing component interacts with a stationarily arranged magnetic bearing component. In accordance with the present invention, the magnetic bearing component connected to the rotor shaft of the spinning rotor is configured as a slotted permanent magnet ring, in order to ensure the deformability required to draw on a ring liner.

Additional advantageous embodiments and features of the invention are described more fully hereinbelow.

The invention has the advantage, in particular, that owing to the use of slotted permanent magnet rings, a limited deformability of these permanent magnet rings is achieved and this facilitates, on the one hand, the slipping of these components onto associated receivers, and also their secure locking on the receivers by drawing on corresponding ring liners. In other words, in a configuration of this type of the permanent magnet rings, it is ensured that the permanent magnet rings are not damaged during their positioning on the bearing lug of their receiver nor during their locking by a ring liner.

As the demands made on the measurement tolerances of the components involved are also relatively low, these components can also be produced economically.

It is provided in this case, in a refined embodiment, that the slotted permanent magnet ring, prior to its installation, has an internal diameter, which is slightly above the external diameter of the associated bearing lug of the receiver. The sliding fit thus produced facilitates the slipping of the permanent magnet ring onto its bearing seat and therefore provides the prerequisite that damage to the slotted permanent magnet ring is very substantially ruled out during this action. As the external diameter of the slotted permanent magnet ring is also slightly above the internal diameter of the ring liner guaranteeing tensile strength, which is to be fixed on the permanent magnet ring, it is nevertheless ensured that the slotted permanent magnet rings, after drawing on the ring liners, are locked so as to be rotationally engaged and very substantially so as to be speed-resistant on the bearing lug of the receiver.

In an advantageous embodiment it is provided that the slot in the permanent magnet ring is dimensioned such that the permanent magnet ring is completely closed after the ring liner has been drawn on. In this manner an out-of-balance occurring owing to the slot during the spinning operation is prevented, and this absolutely has to be avoided with regard to the very high speeds.

As indicated, the slotted permanent magnet rings are advantageously fixed on the bearing lug of a special receiver, which is in turn connected so as to be rotationally engaged with the rotor shaft. A configuration of this type facilitates in particular the assembly of the permanent magnet rings. In other words, the slotted permanent magnet rings can initially be slipped onto the bearing lug of special receivers, in a separate assembly device, and locked there by drawing on the ring liners. The complete receivers can then be fixed in a relatively problem-free manner on the rotor shaft of the spinning rotor.

In an advantageous embodiment, the ring liners are made of a material guaranteeing high tensile strength, preferably carbon fiber reinforced plastics material. Such CFRP ring liners, on the one hand, guarantee tensile strength substantially better than comparable steel liners and are also significantly lighter, which, owing to the low flywheel effect, for example, has a positive effect on the acceleration capacity of the single motor rotor drive.

The invention will be described in more detail hereinafter with the aid of an embodiment shown in the drawings.

DESCRIPTION OF THE PREFERRED EMBODIMENTS

Figure 1:
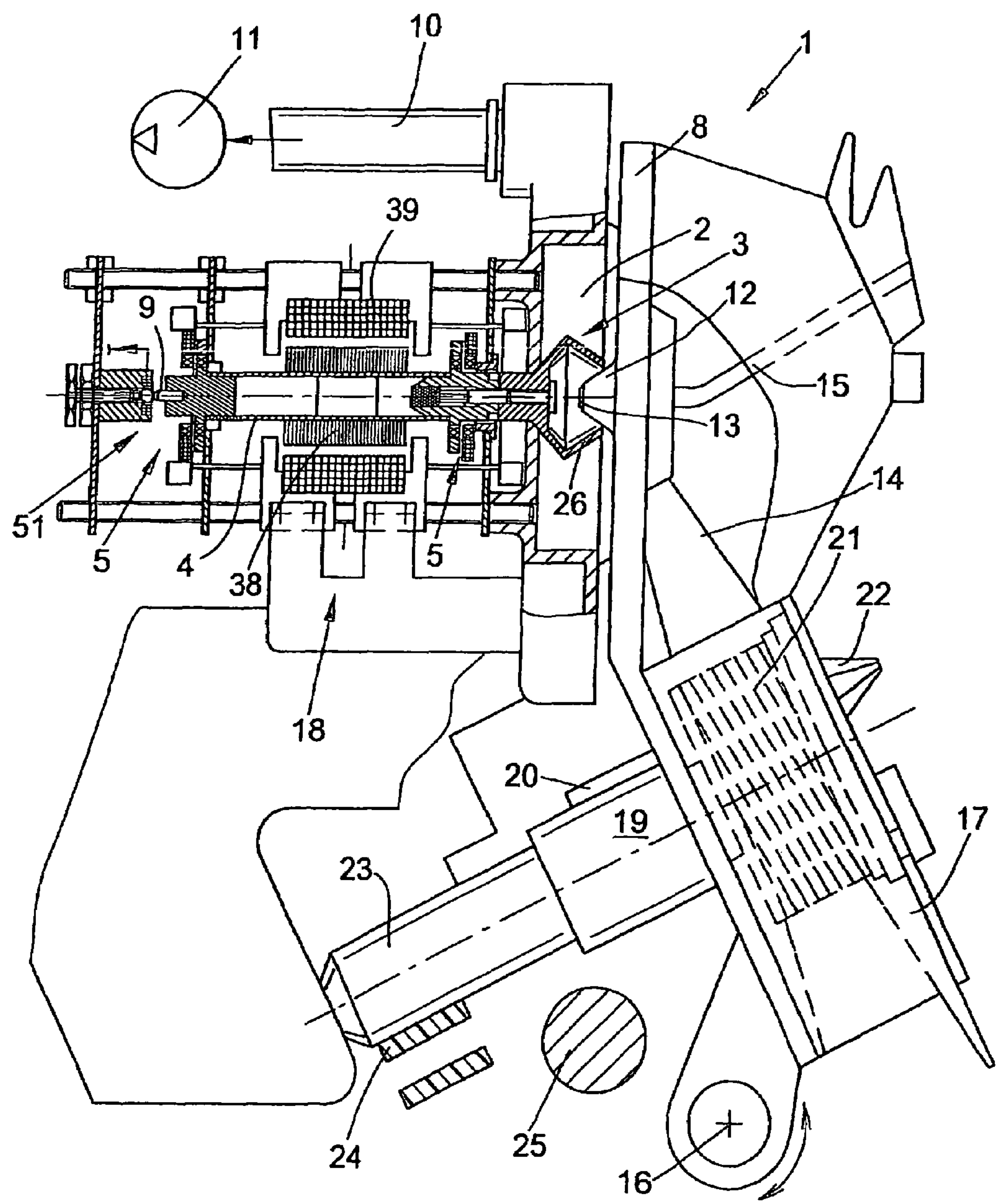
FIG. 1 shows a side view of an open end spinning device with a single motor-driven spinning rotor, which is supported by its rotor shaft in a magnetic bearing arrangement.

An open end spinning device of an open end rotor spinning machine is shown in FIG. 1 and designated by the reference numeral 1. Open end spinning devices I of this type, which are known per se, in each case have a rotor housing 2, in which the spinning cup 26 of a spinning rotor 3 circulates at a high speed. The spinning rotor 3 is driven in this case by an electric motor single drive 18, and is supported by its rotor shaft 4 in magnetic bearing arrangements 5, the permanent magnetic bearing components of which support the rotor shaft 4 both radially and axially.

In the embodiment shown, apart from the magnetic bearing arrangements 5, a rear position sensor 51 is also provided. The structure and the function of bearing sensors 51 of this type are prior art and described in detail, for example in German Patent Publication DE 100 22 736 A1.

As known, the rotor housing 2 which is open per se toward the front, is closed during operation by a pivotable cover element 8 and connected via a corresponding pneumatic line 10 to a low pressure source 11, which generates the low spinning pressure required in the rotor housing 2. Arranged in the cover element 8, or in the channel plate, as is also conventional, is a channel plate adapter 12, which has a thread draw-off nozzle 13 and the opening region of a fiber guide channel 14. A thread draw-off tube 15 adjoins the thread draw-off nozzle 13, in this case.

In the embodiment shown, the cover element 8 is rotatably mounted to a limited extent about a pivot pin 16 and has an opening roller housing 17. The cover element 8 also has rear bearing brackets 19, 20 for mounting an opening roller 21, or a fiber band draw-in cylinder 22. The opening roller 21 is driven in this case in the region of its wharve 23 by a circulating tangential belt 24 along the machine, while the drive (not shown) of the fiber band draw-in cylinder 22 takes place, for example, via a worm gear pair arrangement, which is connected on a drive shaft 25 along the machine.

In an alternative embodiment, the opening roller 21 and/or the fiber band drawn-in cylinder 22 can obviously also be driven by electric motor single drives, for example stepping motors.

The spinning rotor 3, which is freely rotatably mounted in the magnetic bearing arrangements 5, can also be driven, as already indicated above, by means of an electric motor single drive 18. The single drive 18 of the spinning rotor 3 in this case preferably has a permanent magnetic rotor magnet 38 and a stator coil 39 which can be provided with the current in a defined manner.

Figure 2:
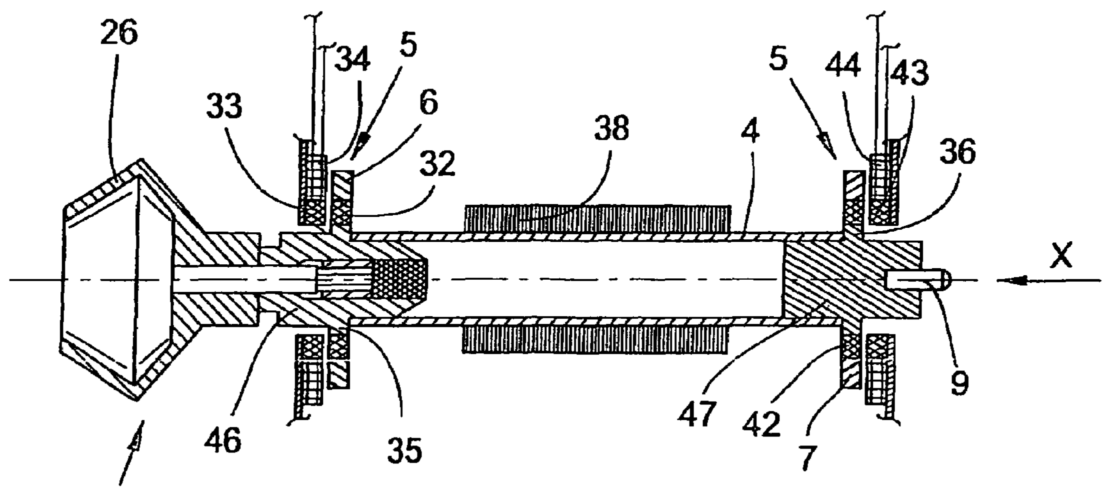
FIG. 2 shows the rotor shaft of a spinning rotor with the magnetic bearing components fixed on the rotor shaft.
Figure 3:
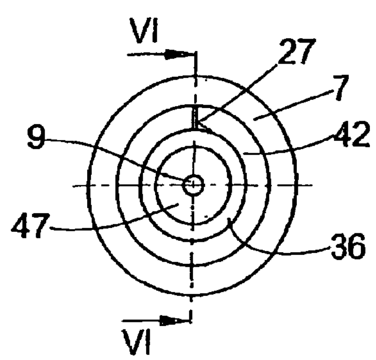
FIG. 3 shows the rotor shaft according to the view of arrow X of FIG. 2.
Figure 4:
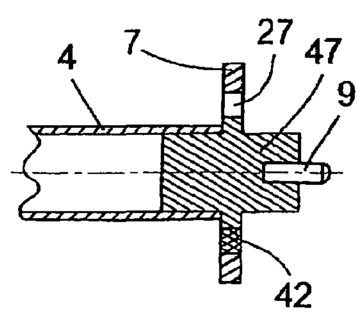
FIG. 4 shows a receiver fixed to the rotor shaft, equipped with a slotted permanent magnet ring and a ring liner, according to Section IV-IV of FIG. 3.

The magnetic bearing arrangements 5 substantially consist, as indicated in FIG. 2, in particular, of the magnetic bearing components 32, 33, 34 or the magnetic bearing components 42, 43, 44.

The magnetic bearing components circulating with the spinning rotor 3 are, in this case, according to the invention, configured as slotted permanent magnet rings 32, 42, which are in each case slipped on a bearing lug 35 or 36 of receivers 46 connected so as to be rotationally engaged with the rotor shaft 4 and are locked there by ring liners 6 or 7. The stationary permanent magnet rings of the bearing devices 5 are designated 33 or 43, the magnetic force of which can be adjusted in a defined manner by means of corresponding electromagnetic coils 34 or 44, preferably as a function of a corresponding signal from the bearing sensor 51.

The slotted permanent magnet rings 32, 42 fixed on the rotor shaft 4, before their assembly preferably have an internal diameter$^{RM}_{internal}$, which is slightly above the external diameter$^{A}_{external}$ of the bearing lug 35 or 36 of the receivers 46 or 47. In other words, the permanent magnet rings 42 can be slipped in a problem-free manner onto the bearing lug 35 or 36 of the receivers 46 or 47 and locked there by drawing on a ring liner 6 or 7 guaranteeing high tensile strength.

The ring liners 6, 7 are preferably manufactured, in this case, from carbon fiber reinforced plastics material and have an internal diameter$^{RB}_{internal}$, which is slightly below the external diameter$^{RM}_{external}$ of the permanent magnet rings. This means that by slipping on the ring liners 6 or 7, the permanent magnet rings 32 or 42, which have a certain deformability owing to their slot 27, can be pressed and thus securely locked against the bearing lugs 35 or 36 of the receivers 46 or 47.

The invention claimed is:

1. Rotor shaft of a spinning rotor with an annular magnetic bearing component, which is secured with respect to the centrifugal force effective during the spinning process by a ring liner, for radially and axially supporting the rotor shaft, wherein the rotatable magnetic bearing component interacts with a stationarily arranged magnetic bearing component, characterized in that the magnetic bearing component connected to the rotor shaft (4) of the spinning rotor (3) is configured as a disk-shaped permanent magnet ring (32, 42) having a radial slot formed entirely through the magnet, in order to ensure the deformability required to draw on a ring liner (6, 7).

2. Rotor shaft according to claim 1, characterized in that the slotted permanent magnet ring (32, 42), prior to its installation, has an internal diameter ($^{RM}{}_{internal}$), which is slightly above the external diameter ($^{A}{}_{external}$) of the bearing lug(35, 36)of a receiver (46, 47) and has an external diameter ($^{RM}{}_{external}$), which is above the internal diameter ($^{RB}{}_{internal}$) of the ring liner (6, 7).

3. Rotor shaft according to claim 1, characterized in that the slot (27) is dimensioned such that the permanent magnet ring (32, 42) is completely closed after drawing on the ring liner (6, 7).

4. Rotor shaft according to claim 1, characterized in that the slotted permanent magnet ring (32, 42) is locked on a bearing lug (35, 36)of a receiver (46, 47) which is connected in a rotationally engaged manner to the rotor shaft (4).

5. Rotor shaft according to claim 1, characterized in that the ring liner (6, 7) is manufactured from a material guaranteeing high tensile strength, preferably a carbon fiber-reinforced plastics material (CFRP).

* * * * *